United States Patent [19]

Tanaka et al.

[11] Patent Number: 5,010,265
[45] Date of Patent: Apr. 23, 1991

[54] MOISTURE DRAIN BUSH FOR AN ENGINE STARTER MOTOR

[75] Inventors: Takao Tanaka; Kazuhiro Odahara, both of Himeji, Japan

[73] Assignee: Mitsubishi Denki Kabushiki Kaisha, Tokyo, Japan

[21] Appl. No.: 477,376

[22] Filed: Feb. 9, 1990

[30] Foreign Application Priority Data

Feb. 10, 1989 [JP] Japan .................................. 1-32123

[51] Int. Cl.$^5$ ............................................... H02K 5/10
[52] U.S. Cl. ............................................ 310/88; 74/6; 74/7 R; 290/48; 310/89; 310/157
[58] Field of Search ........................ 74/6, 7 R; 290/48; 310/88, 89, 157

[56] References Cited

U.S. PATENT DOCUMENTS

| | | | |
|---|---|---|---|
| 4,464,593 | 8/1984 | Kofink | 310/88 |
| 4,491,754 | 1/1985 | Gotah | 310/88 |
| 4,808,871 | 2/1988 | Morishita et al. | 310/89 |

Primary Examiner—A. D. Pellinen
Assistant Examiner—R. Hoover
Attorney, Agent, or Firm—Sughrue, Mion, Zinn, Macpeak and Seas

[57] ABSTRACT

A moisture drain bush for use in a moisture drain hole in an engine starter motor housing wall comprises a stem having a first and a second end and an axial length equal to a housing wall thickness and having an axial groove extending between the first and second ends of the stem. A first flange may be frustoconical shape so that its conical circumferential surface guide and assists smooth insertion of the flange into the drain hole, and has a flat inner surface radially extending from the first end of the stem and larger than the drain hole is provided. The first flange also has a first radial groove connected to one end of the axial groove in the stem and radially extending to the outer periphery of the first flange. A second flange having a flat inner surface radially extends from the second end of the stem and larger than the drain hole is provided. The second flange has a second radial groove connected to the other end of the axial groove in the stem and radially extends to the outer periphery of the second flange. Thus, when the drain bush is inserted within the drain hole in the motor housing, the axial groove and the first and second radial grooves as well as the drain hole together defining a continuous but bent moisture drain path.

5 Claims, 2 Drawing Sheets

MOISTURE DRAIN BUSH FOR AN ENGINE STARTER MOTOR

BACKGROUND OF THE INVENTION

This invention relates to a moisture drain bush for an engine starter motor and, more particularly, to a moisture drain bush adapted to be inserted into and held by a moisture drain hole defined in a housing wall of an engine starter motor.

FIG. 1 illustrates one example of a conventional moisture drain bush attached to an engine starter motor. In FIG. 1, a starter motor 1 comprises a d.c. motor 2, an over-running clutch unit with a pinion (not shown) disposed within a front bracket 3 and a solenoid switch unit 4 disposed above the motor 2 and the clutch unit. The d.c. motor 2 includes a yoke 5 and a rear bracket 6 mounted to the yoke 5 for rotatably supporting a rear end of a rotary shaft 8 of the motor 2 through a bearing 7. The motor 2 further includes a commutator 9 which is in sliding contact with a brush assembly 10 supported from the rear bracket 6. The rear bracket 6 has formed therein a moisture drain hole 11 in which a moisture drain bush 12 is inserted and held.

In FIGS. 2 and 3, which illustrate the details of the drain bush 12, the drain bush 12 is a substantially cylindrical tube member comprising a main body 13, an upper flange 14 formed at the upper end of the mian body portion 13, a lower flange 15 disposed below the upper flange 14 with a clearance or a circumferential groove therebetween for receiving therein an edge of the rear bracket 6 defining the drain hole 11. The drain bush 12 also comprises a plurality of buffer plates 16 extending radially inwardly and downwardly and alternatively from the diametrically opposite inner surfaces of the tube so that a ladyrinth or a serpentine flow path is defined. The upper flange 14 has formed therein two radially extending notches 14a.

The moisture within the motor housing flows through the drain notches 14a into the drain bush main body portion 13 and flows out from the bottom end of the drain bush 12. The splashed water drops entering into the drain bush 12 from its bottom end are prevented by the buffle plates 16 from passing through the drain bush 12 and entering into the interior of the motor housing.

With the above described conventional moisture drain bush, the drain bush 12 is projecting from the rear bracket 6 by a substantial outwardly distance. Therefore, the degree of freedom of the installation of the starter motor is limitted and some mounting space is occuppied by the projecting drain bush 12.

SUMMARY OF THE INVENTION

Accorddingly, one object of the present invention is to provide a moisture drain bush for engine starter motor free from the above discussed problems.

Another object of the present invention is to provide a moisture drain bush having substantially no projecting portion.

Another object of the present invention is to provide a moisture drain bush which is simple in structure and which does not extend outwardly of the motor housing.

A further object of the present invention is to provide a moisture drain bush which is simple in structure and has substantially no outwardly projection portion and which effectively prevent ingress of water from the outside of the motor housing.

With the above objects in view, the moisture drain bush for use in a moisture drain hole in an engine starter motor housing wall of the present invention comprises a stem having a first and a second end and an axial length equal to a housing wall thickness and having an axial groove extending between the first and second ends of the stem. A first flange may be frustoconical shape so that its conical circumferential surface guides and assists smooth insertion of the flange into the drain hole, and has a flat inner surface radially extending from the first end of the stem and larger than the drain hole is provided. The first flange also has a first radial groove connected to one end of the axial groove in the stem and radially extending to the outer periphery of the first flange. A second flange having a flat inner surface radially extends from the second end of the stem and larger than the drain hole is provided. The second flange has a second radial groove connected to the other end of the axial groove in the stem and radially extends to the outer periphery of the second flange. Thus, when the drain bush is inserted within the drain hole in the motor housing, the axial groove and the first and second radial grooves as well as the drain hole together defining a continuous but bent moisture drain path.

BRIEF DESCRIPTION OF THE DRAWINGS the present invention will become more readily apparent from the following detailed description of the preferred embodiment of the present invention taken in conjunction with the accompanying drawings, in which.

DESCRIPTION OF THE PREFERRED EMBODIMENT

Figure 1:
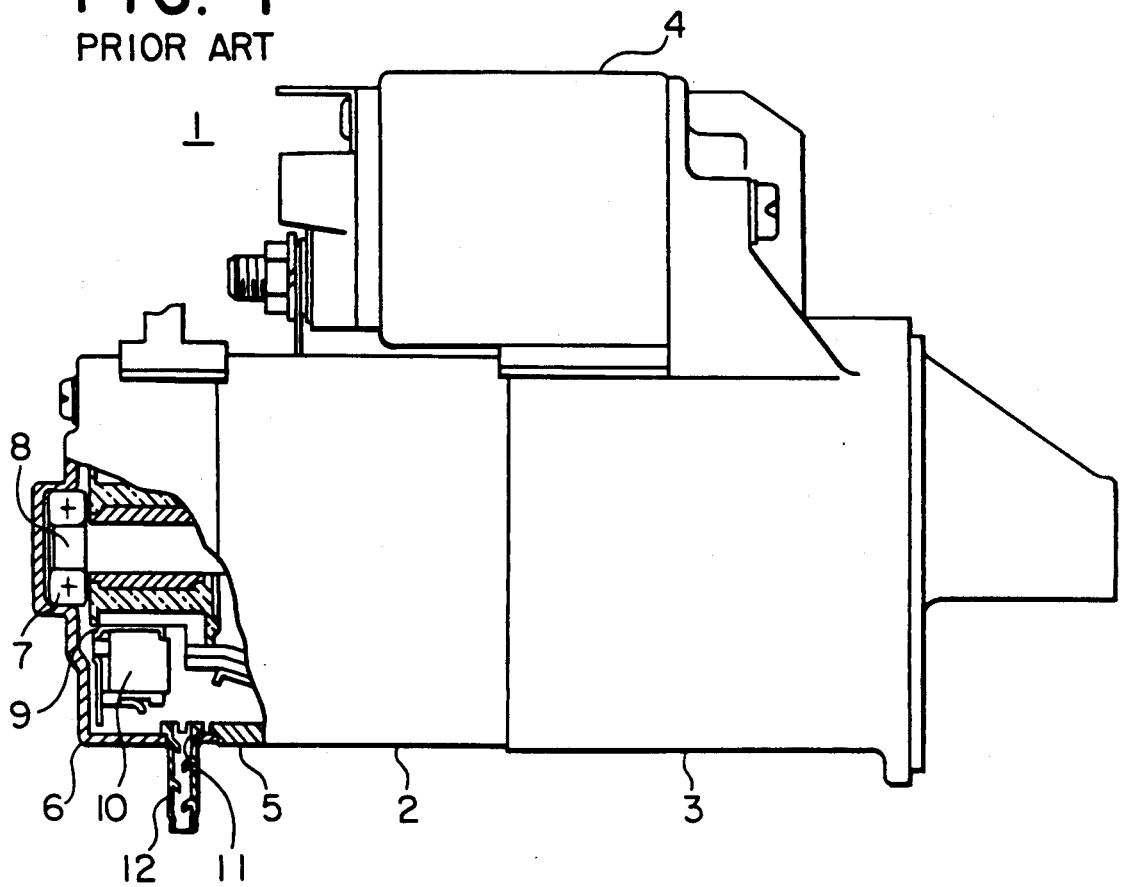
FIG. 1 is a side view of an engine starter motor partly in section illustrating a conventional moisture drain bush.
Figure 2:
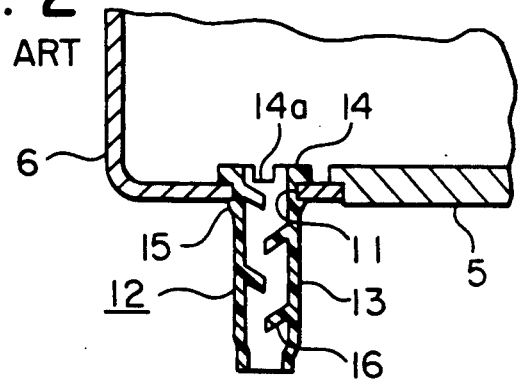
FIG. 2 is a sectional view of the mosture drain bush shown in FIG. 1 attached to the rear bracket of the starter motor.
Figure 3:
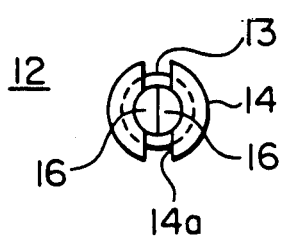
FIG. 3 is a plan view of the moisture drain bush shown in FIG. 2.
Figure 4:
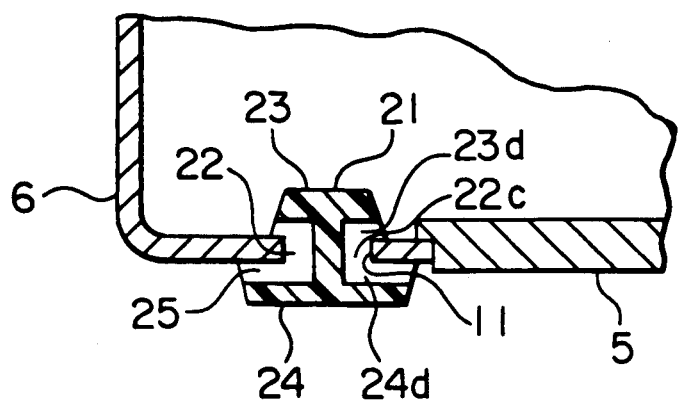
FIG. 4 is a sectional view of the moisture drain bush of the present invention as attached to the rear bracket of the starter motor.
Figure 5:
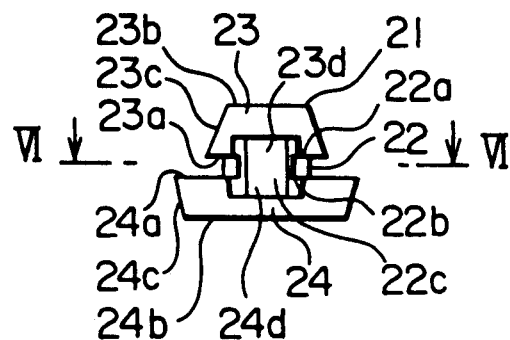
FIG. 5 is a side view of the moisture drain bush of the present invention.
Figure 6:
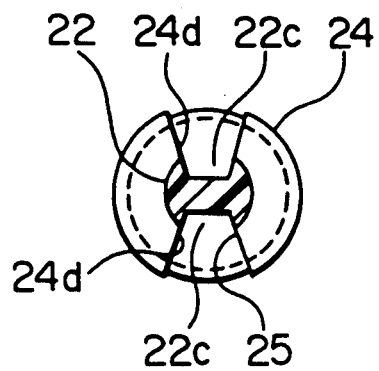
FIG. 6 is a sectional view of the moisture drain bush taken along line 6—6 of FIG. 5.

FIGS. 4 to 6 illustrate a moisture drain bush 21 adapted to be inserted into and held by a moisture drain hole 11 defined in a housing wall 6 of a an engine starter motor 5. In the illustrated embodiment, the housing wall 6 in which the moisture drain hole 11 is formed is a rear bracket attached to a yoke of the starter motor 5. The moisture drain bush 21 is made of a elastic material such as rubber and a relatively soft flexible synthetic resin.

The moisture drain bush 21 comprises a substantially cylindrical, relatively short stem 22 having a first end 22a and a second end 22b. The stem 22 has an axial length substantially equal to the thickness of the rear bracket 6 and the diameter substantially equal to the diameter of the drain hole 11. The stem 22 also has formed therein two axial grooves 22c extending between the first and the second ends 22a and 22b of the stem 22 over the entire length of the stem 22. The two axial grooves 22c are disposed at the diametrically opposite positions on the circumference of the cylindrical stem 22 as best seen from FIG. 6.

The moisture drain bush 21 also comprises a substantially frustoconical first flange 23 having a substantially flat inner surface 23a radially extending from the first end 22a of the stem 22, a substantially flat outer surface 23b parallel to the inner surface 23a and a substantially conical circumferential surface 23c between the inner and the outer surfaces 23a and 23b. As best seen from FIG. 4, the inner surface 23a has a diameter larger than the diameter of the drain hole 11 and the outer surface 23b has a diameter smaller than the diameter of the drain hole 11. The first flange 23 also has formed in the inner surface 23a two first radial grooves 23d extending in the radially opposite directions and each connected at an inner end thereof to one end of each axial grooves 22c in the stem 22. The outer ends of the radial grooves 23d are open at two diametrically opposite positions on the conical circumferential surface 23c or the outer pheriphery of the first flange 23.

The moisture drain bush 21 further comprises a substantially frustoconical second flange 24 having a substantially flat inner surface 24a radially extending from the second end 22b of the stem 22, a substantially flat outer surface 24b parallel to the inner surface 24a and a substantially conical circumferential surface 24c between the inner and the outer surfaces 24a and 24b. As best seen from FIG. 4, the inner surface 24a has a diameter larger than the diameter of the drain hole 11 and the outer surface 24b has a diameter slightly smaller than the diameter of the outer surface 24b. The second flange 24 also has formed in the inner surface 24a two second radial grooves 24d extending in the radially opposite directions and each connected at an inner end thereof to one end of each axial grooves 22c in the stem 22. The outer ends of the radial grooves 24d are open at two diametrically opposite positions on the conical circumferential surface 24c or the outer periphery of the second flange 24.

The first flange 23 is made of an elastic material and has the tapered or conical surface 23c having a circumference at 23b having a diameter smaller than the diameter of the drain hole 11. Therefore, although the first flange 23 has the diameter larger than that of the drain hole 11, the conical surface 23c of the first flange 23 is permitted to ride and slide on the edge of the housing wall 6 defining the drain hole 11 when the first flange 23 is forced into the the drain hole 11. At this time, the first flange 23 is deformed to overpass the smaller-diameter drain hole 11 to receive the edge portion of the rear bracket wall 6 defining the drain hole 11 within a circumferential groove defined between the first and the second flanges 23 and 24 and the stem 22.

More particularly, as best seen from FIG. 4, when the moisture drain bush 21 is inserted into the drain hole 11 in the rear bracket 6, the stem 22 fits at its outer circumference the edge of the drain hole 11, and the edge portion of the rear bracket 6 defining the drain hole 11 is sandwitched between the inner surfaces 23a and 24a of the first and the second flanges 23 and 24. Therefore, the moisture drain bush 21 is reliably held in the inserted position shown in FIG. 4.

It is also seen that the first radial grooves 23d of the first flange 23, the axial grooves 22c of the stem 22 and the second radial grooves 24d of the second flange 24 are serially connected in the above-named order at each diametrically opposite sides of the moisture drain bush 21 to define continuous moisture passages 25 which, when the drain bush 21 is inserted within the drain hole 11 in the motor housing rear bracket 6, define together with the edge of the drain hole 11 a U-shaped labyrinth passage for allowing the moisture inside of the motor housing to be drained. While these drain passages 25 allow the moisture within the starter motor to be drained therethrough water drops or any other foreign matters are not perimitted to enter into the housing.

As has been described. according to the present invention the moisture drain bush for use in a moisture drain hole in an engine starter motor housing wall of the present invention comprises a stem having a first and a second end and an axial length equal to a housing wall thickness and having an axial groove extending between the first and second ends of the stem. A first flange may be frusticonical shape so that its conical circumferential surface guide and assists smooth insertion of the flange into the drain hole, and has a flat inner surface radially extending from the first end of the stem and larger than the drain hole is so provided. The first flange also has a first radial groove connected to one end of the axial groove in the stem and radially extending to the outer periphery of the first flange. A second flange having a flat inner surface radially extends from the second end of the stem and larger than the drain hole is provided. The second flange has a second radial groove connected to the other end of the axial groove in the stem and radially extends to the outer periphery of the second flange. Thus, when the drain bush is inserted within the drain hole in the motor housing, the axial groove and the first and second radial grooves as well as the drain hole together define a continuous but bent moisture drain path.

Therefore, the moisture drain bush of the present invention is simple in structure and has substantially no outwardly projecting portion and which effectively prevents ingress of water from the outside of the motor housing.

What is claimed is:

1. A moisture drain bush adapted to be inserted into and held by a moisture drain hole defined in a housing wall of an engine starter motor, comprising:
a stem having a first and a second end, said stem having an axial length substantially equal to a thickness of said housing wall and having an axial groove extending between said first and second ends of said stem;
a first flange having a substantially flat inner surface radially extending from said first end of said stem, said inner surface having a diameter larger than the diameter of said drain hole and having a first radial groove connected to one end of said axial groove in said stem and radially extending to the outer periphery of said first flange; and
a second flange having a substantially flat inner surface radially extending from said second end of said stem, said inner surface having a diameter larger than the diameter of said drain hole and having a second radial groove connected to the other end of said axial groove in said stem and radially extending to the outer periphery of said second flange;
whereby, when said drain bush is inserted within said drain hole in said motor housing, said axial groove and said first and second radial grooves as well as said drain hole together defining a continuous but bent moisture drain path.

2. A moisture drain bush as claimed in claim 1, wherein said first flange having a substantially conical surface, said conical surface having a top surface having a top surface having a diameter smaller than the diameter of said drain hole, whereby said top surface assists the edge of said housing wall defining said drain hole to ride and slide thereon to override said larger diameter of said inner surface of said first flange.

3. A moisture drain bush as claimed in claim 1, wherein said axial groove and said first and second radial grooves are provided at two diametrically opposite positions.

4. A moisture drain bush as claimed in claim 1, wherein said first flange has a substantially frustoconical shape.

5. A moisture drain bush as claimed in claim 1, wherein said first flange having a substantially conical surface, said conical surface having a top surface having a diameter smaller than the diameter of said drain hole, whereby said conical surface assists the edge of said housing wall defining said drain hole to ride and slide thereon to overide said larger diameter of said inner surface of said first flange, and said axial groove and said first and second radial grooves are provided at two diameterically opposite positions, and said first flange has a substantially frustoconical shape.

* * * * *